United States Patent [19]
Ito et al.

[11] Patent Number: 4,966,115
[45] Date of Patent: Oct. 30, 1990

[54] CONTROL MEANS OF INTERNAL COMBUSTION ENGINE FOR MARINE PROPULSION

[75] Inventors: Kazumasa Ito; Yosihide Hirano, all of Hamamatsu, Japan

[73] Assignee: Sanshin Kogyo Kabushiki Kaisha, Hamamatsu, Japan

[21] Appl. No.: 229,924

[22] Filed: Aug. 8, 1988

[30] Foreign Application Priority Data

Aug. 8, 1987 [JP] Japan .................................. 62-198727

[51] Int. Cl.⁵ ............................................ F02P 5/145
[52] U.S. Cl. .................................... 123/418; 123/335; 123/602; 123/198 DC; 74/851
[58] Field of Search ........... 123/198 D, 198 DC, 335, 123/406, , 422, 423, 418, 599, 602, 630, 417; 74/851, 854

[56] References Cited

U.S. PATENT DOCUMENTS

| | | | |
|---|---|---|---|
| 3,855,985 | 12/1974 | Shirai | 123/422 |
| 4,074,665 | 2/1978 | Patis | 123/335 |
| 4,441,478 | 4/1984 | Fujimoto | 123/602 |
| 4,528,970 | 7/1985 | Fujimoto | 123/602 |
| 4,633,834 | 1/1987 | Takeuchi et al. | 123/602 X |
| 4,644,927 | 2/1987 | Okuda | 123/602 |
| 4,726,798 | 2/1988 | Davis | 123/335 X |
| 4,794,897 | 1/1989 | Kinouchi | 123/335 X |

Primary Examiner—Willis R. Wolfe
Attorney, Agent, or Firm—Ernest A. Beutler

[57] ABSTRACT

A number of embodiments of engine spark control systems wherein the engine speed is reduced in response to the sensing of an abnormal or an external condition and wherein the spark timing is altered when the spark is interrupted to preclude the likelihood of backfiring in the exhaust system or firing back in the induction system. In some embodiments, the sensed condition is an abnormal running condition and in other embodiments the sensed condition is shifting of the transmission. The backfiring and firing back is precluded primarily by advancing the spark from the idle spark advance.

15 Claims, 11 Drawing Sheets

CONTROL MEANS OF INTERNAL COMBUSTION ENGINE FOR MARINE PROPULSION

This invention relates to a control means for an internal combustion engine for a marine propulsion unit and more particularly to a spark control system for a spark ignited internal combustion engine.

It is well known to adjust the spark timing of an internal combustion engine in response to varying engine characteristics such as speed or throttle opening. Generally, the spark timing is advanced as engine speed increases although there may be fixed periods where the spark is not advanced at idle and after the throttle or speed has reached a predetermined amount. For the most part, the spark advance characteristics of an engine are set and do not vary during engine operation, except as aforenoted.

It has been proposed to reduce engine speed for engine protection in the event of certain forxs of malfunctions, such as overheating, lack of lubricant or the like. In addition, with marine transmissions as well as with other forms of transmissions, it is a practice to slow the speed of the engine during shifting so as to facilitate shift engagement. Normally, this slowing of the engine for either purpose is accomplished by misfiring of the spark plugs. Although this is a very effective method of engine protection, the misfiring can cause explosions to occur in the exhaust system of the engine. The reason for this is that a fuel/air mixture from some cylinders may be discharged into the exhaust system and ignited by the charge from other cylinders. In addition to the backfiring condition described, the misfiring of the engine can also cause a condition known as "firing back" where combustion is transmitted from the combustion chamber to the induction system, wherein a combustible fuel/air mixture is present.

It is, therefore, a principal object of this invention to provide an improved arrangement for controlling the spark of an internal combustion engine.

It is a further object of this invention to provide a spark control system for an engine wherein the engine can be slowed by misfiring and backfiring or firing back will be precluded or substantially reduced.

SUMMARY OF THE INVENTION

A first feature of this invention is adapted to be embodied in a spark control for an internal combustion engine comprising spark timing means for firing a spark plug in accordance with a first advance curve in relation to an engine characteristic and a second different advance curve in relation to that same engine characteristic. Means are provided for selecting which of the advance curves control the engine spark timing.

Another feature of the invention is adapted to be embodied in a spark control for an internal combustion engine that includes a spark plug and means for firing the spark plug. Means are provided for periodically interrupting the firing of the spark plug in response to a sensed condition and means are incorporated for changing the spark timing when the spark plug is fired in response to the interruption of the spark plug firing.

THE PREFERRED EMBODIMENTS

Figure 1:
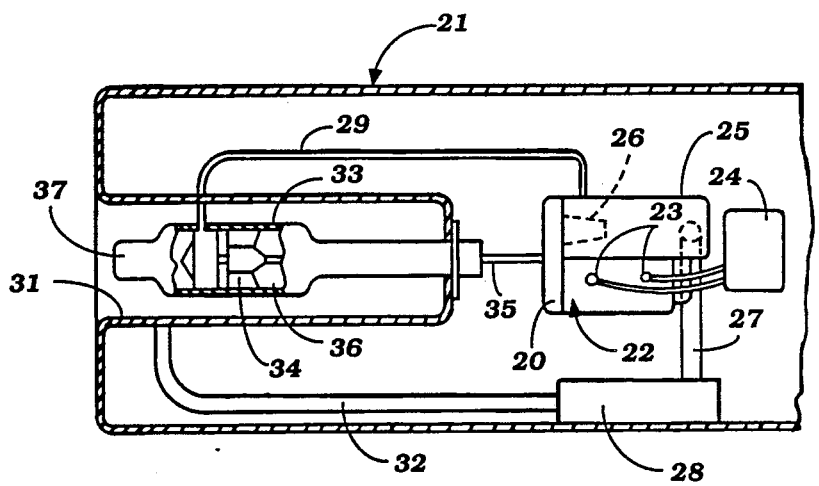
FIG. 1 is a partial top plan view of a small watercraft powered by an internal combustion engine constructed in accordance with an embodiment of the invention, with portions broken away and other portions shown schematically.
Figure 2:
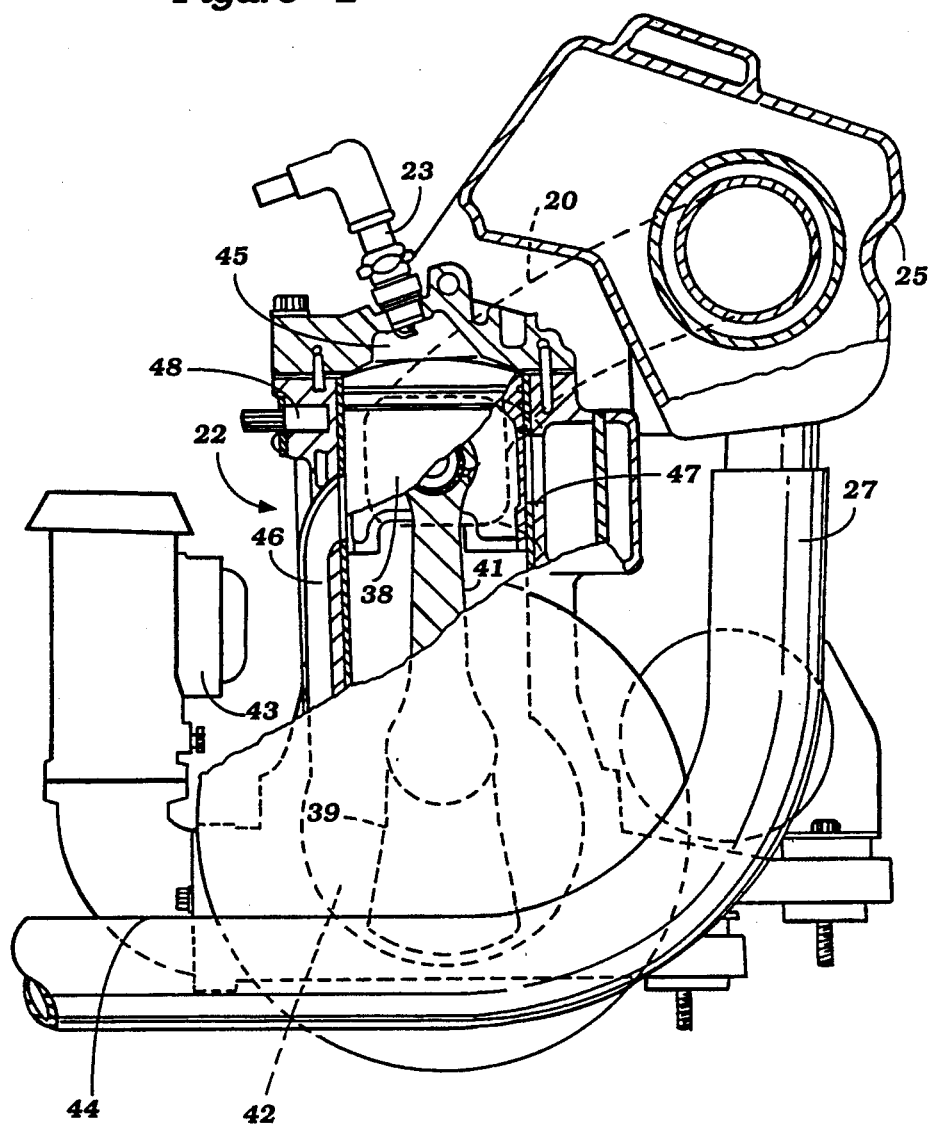
FIG. 2 is an enlarged end elevational view of the engine, with portions broken away.

Referring first to FIGS. 1 and 2 and initially primarily to FIG. 1, a small watercraft is shown partially and is identified generally by the reference numeral 21. The small watercraft 21 is depicted as being a typical environment in which the invention may find particular utility.

The watercraft 21 is depicted as being of the jet propelled type and is designed to be operated primarily by a single rider. The watercraft 21 is powered by an internal combustion engine 22, which in the illustrated embodiment is of the in line spark ignited, crankcase compression, two cycle type. It is to understood, however, that the invention can be utilized in conjunction with a wide variety of other types of engines and in other applications.

The engine 22 includes a pair of spark plugs 23 that are fired by a spark control device 24 which embodies the invention and which will be described in more detail as this description proceeds.

The exhaust gases which are discharged from the cylinders of the engine 22 are transferred through a transfer passage 20 formed at one end of the engine and are discharged into an expansion chamber device 25 through a megaphone section 26. From the expansion chamber device 25, the exhaust gases are transmitted through a flexible conduit 27 to a further expansion chamber and water lock device 28. The device 28 is incorporated to provide silencing and cooling of the exhaust gases and to insure against the introduction of water from the exhaust system into the cylinders of the engine. It should be noted that water is also delivered to a cooling jacket of the expansion chamber 25 through a conduit 29 under pressure, in a manner to be described.

The exhaust gases are discharged from the second expansion chamber 28 to a tunnel 31 formed in the underside of the hull of the watercraft through an exhaust conduit 32.

A jet drive unit, indicated generally by the reference numeral 33 is contained within the tunnel 31 and has an impeller 34 that is driven by the engine output shaft through a drive shaft 35. Water is drawn into the impeller chamber of the jet drive unit 33 through an inlet 36 and is discharged through a steerable nozzle 37. The impeller 34 also pressurizes water in the conduit 29.

Referring specifically to FIG. 2, more details of the construction of the engine 22 are illustrated here. As may be seen, the engine 22 includes pistons 38 that reciprocate in respective cylinder bores and rotatably drive a crankshaft 39 through connecting rods 41 in a known manner. The crank shaft 38 is rotatably journaled in a crankcase including individually sealed crankcase chambers 42. A fuel/air charge is delivered from carburetors 43 to the crankcase chambers 42 through an intake manifold 44.

The charge in the crankcase chambers 22 is transferred during descent of the pistons 38 from the chambers to a combustion chamber 45 by means of scavenge passages 46. This charge is then burnt by firing of the spark plugs 23 and the charge is exhausted through exhaust ports 47 and the exhaust passages already described.

In this embodiment of the invention, there is provided a temperature sensor 48 that is positioned in the cylinder block of the engine in proximity to the combustion chamber 45 and which senses overheating conditions. In the event overheating conditions are sensed, the engine is provided with a system which is operative to reduce the engine speed through misfiring of the spark plugs 23. As has been previously noted, the misfiring of the spark plugs in order to reduce engine speed is particularly effective. However, under some extreme circumstances there may be the likelihood of firing of a fuel/air mixture in the exhaust system and when the exhaust system includes components which may be relatively light in gauge or weight, such backfires can be troublesome. There is also the possibility of firing back into the induction system. Therefore, in accordance with the invention, the system is also provided with an arrangement which will change the spark timing when misfiring occurs so as to minimize the likelihood of such backfiring or firing back. This system may be best understood by reference to the schematic view of FIG. 3.

Figure 3:
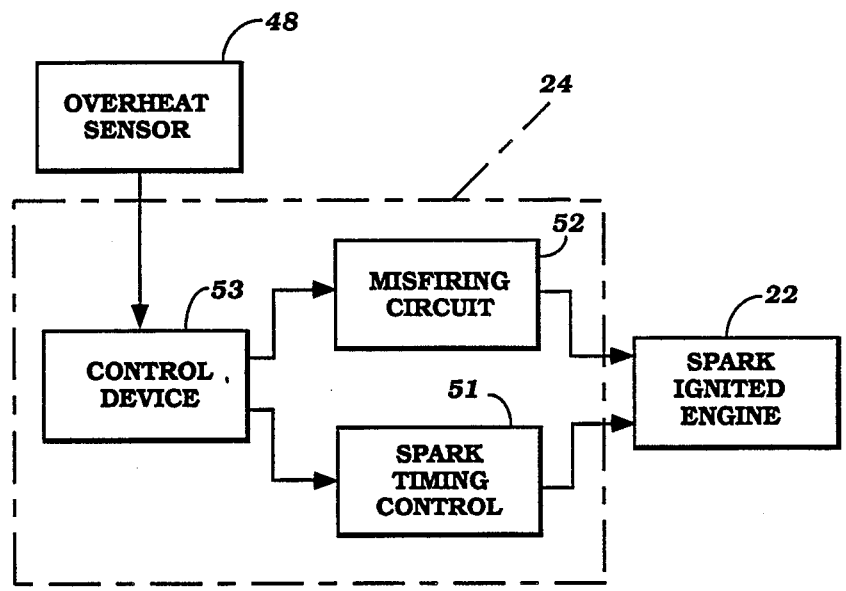
FIG. 3 is a schematic block diagram showing the construction and operation of an embodiment of the invention.

Referring specifically to FIG. 3, the engine 22 and specifically it spark plugs 23 are fired by means of the spark control device 24 which includes a means for controlling the spark timing, indicated generally at 51 and a means for effecting misfiring of the spark plugs, indicated generally at 52. A control means 53 provides control signals to both the spark timing control 51 and the misfiring control 52. The control means 53 receives input information from the temperature sensor 48 so as to indicate when the engine is overheated.

Figure 4:
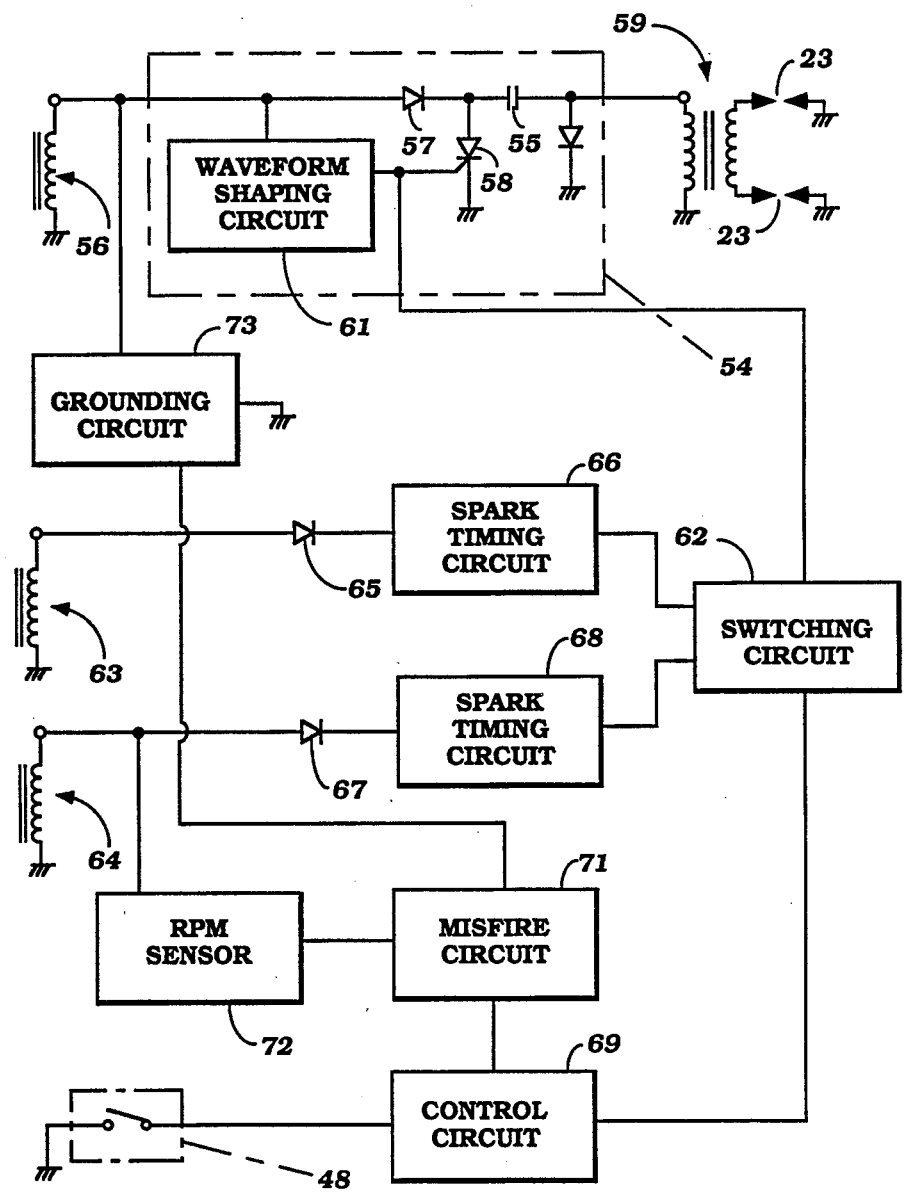
FIG. 4 is a circuit diagram showing this first embodiment.

The actual circuit for this embodiment is shown in more detail in FIG. 4. Referring specifically to this figure, the engine 22 is provided with an SCR type of ignition circuit indicated generally by the reference numeral 54 that comprises a charging capacitor 55 that is charged from a charging coil 56 of the magneto generator system of the engine 22 through a rectifying diode 57. A thyristor 58 is connected to the ground and is switched, in a manner to be described, at an appropriate timing so as to discharge the capacitor 55 and generate a voltage in the winding of a spark coil 59 for firing the spark plugs 23 in a known manner.

The switching of the thyristor 58 and the timing thereof is controlled by the combined signal generated by a wave form shaping circuit 61 and one of two signals selected by a switching circuit 62. These two signals are derived from respective pulser coils 63 or 64. The pulser coils 63 may be considered to be a normal pulser coil and cooperates with the fly wheel magneto to output a signal through a diode 65 to a spark timing circuit 66. The circuit 66 coupled with the circuit 61 provides a spark timing curve of a normal characteristic as shown by the curve A in FIG. 5. This normal spark timing circuit provides a constant spark advance $O_1$ from idle speed up to a predetermined relatively low engine speed indicated at the point a on FIG. 5. The spark then is gradually advanced along the curve A until a fixed maximum spark advance $O_2$ at a substantially higher engine speed b. The spark advance then is maintained constant at the advance angle $O_2$ throughout the remainder of the engine speed.

The pulser coil 64 is set at a greater advance angle than the pulser coil 63 and outputs a signal to a diode 67 to a second spark timing circuit 68. The spark timing circuit 68 coupled with the wave formed shaping circuit 61 provides a constant spark advance as shown by the curve B. This constant spark advance is a fixed advance throughout the engine speed at an advance angle $O_3$ that is something less than maximum spark advance $O_2$ but substantially greater than the spark advance at idle $O_1$. The reason for this substantially advanced spark is to insure that backfiring will not occur since all of the fuel/air mixture in the cylinder will be burned there and none can escape through the exhaust port when it is opened. The timing is also set so that firing back through the induction system will be precluded.

As has been noted, the engine is also provided with an arrangement that slows the engine speed when an abnormal condition is sensed such as overheating. Although the system is described in conjunction with an overheating sensor, it is to be understood that it can be used with other types of devices that slow the engine so as to prevent damage under abnormal conditions such as low oil level and the like. In addition, the device also may be utilized in conjunction with systems wherein the engine speed is slowed periodically for other purposes, such as to assist shifting.

The abnormal condition indicator, in this embodiment, the overheat sensor, outputs a signal to a control circuit 69 that is operative to operate both a misfiring circuit 71 and also the switching circuit 62. The misfiring circuit also receives an engine speed signal from a speed sensing circuit 72, which provides a speed signal in response to the output of the pulser coil 64 and transmits that signal to the misfiring circuit 71 for transmission to and from the control circuit 69. The misfiring circuit 71 also operates, when initiated by the control circuit, a grounding circuit 73 that grounds the output of the charging coil 56 so as to prevent charging of the capacitor 53 and accordingly, firing of the spark plugs 23. The circuit is such that the sparks are interrupted only intermittently and not continuously so that the engine will slow down but not stop.

In the embodiment and circuitry shown in FIG. 4, the spark plugs 23 are wired in series with the secondary winding of the spark coil and hence will be fired in unison. This type of arrangement is particularly useful where the engine speed is reduced by skipping the firing of all of the spark plugs or groups of them simultaneously. It is to be understood, however, that the invention can be also employed in arrangements wherein the spark plugs are fired by separate parallel circuits. In such an arrangement, the engine speed may be slowed by misfiring either all or only some of the spark plugs.

Figure 5:
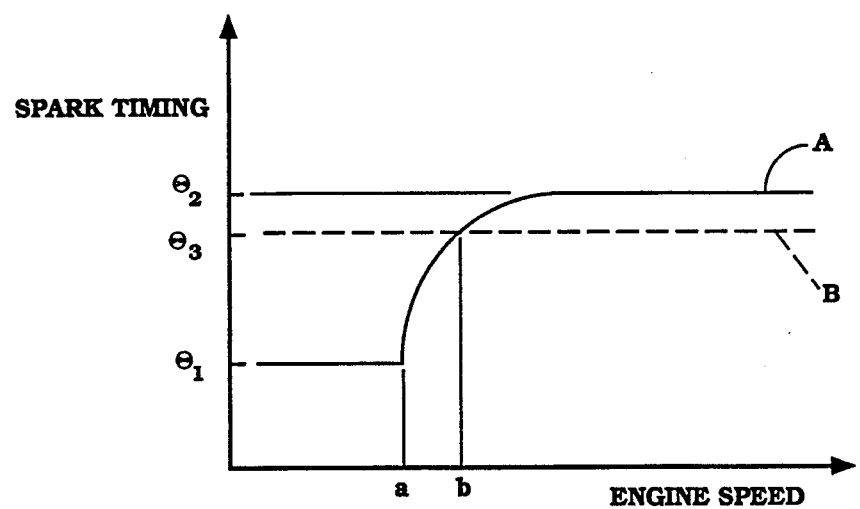
FIG. 5 is a spark timing curve employed in connection with this embodiment of the invention. In this figure, engine speed is shown on the abscissa and spark advance on the ordinate.

The misfiring circuit 71 and control circuit 69 are designed so as to control or reduce the engine speed only in the event the abnormal condition is sensed and the engine speed exceeds a predetermined speed. Also, the switching circuit 62 is not operated until the grounding circuit 73 is energized so that normal spark control will be operative under all conditions except for when the abnormal sensing condition switch 48 is closed. As a result, during normal engine running, the spark advance will follow the curve A as output by the spark timing circuit 66 and wave formed shaping circuit 61. However, when the abnormal condition exists and the engine speed is being reduced, the switching circuit 62 will switch to the output from the spark timing circuit 68 which, coupled with the wave forming shaping circuit 61, output a signal that gives a fixed spark advance B as shown in FIG. 5. It is to be understood that other forms of spark advance that will reduce the likelihood of backfiring or firing back may be employed from the fixed advance curve as depicted in this embodiment.

Figure 6:
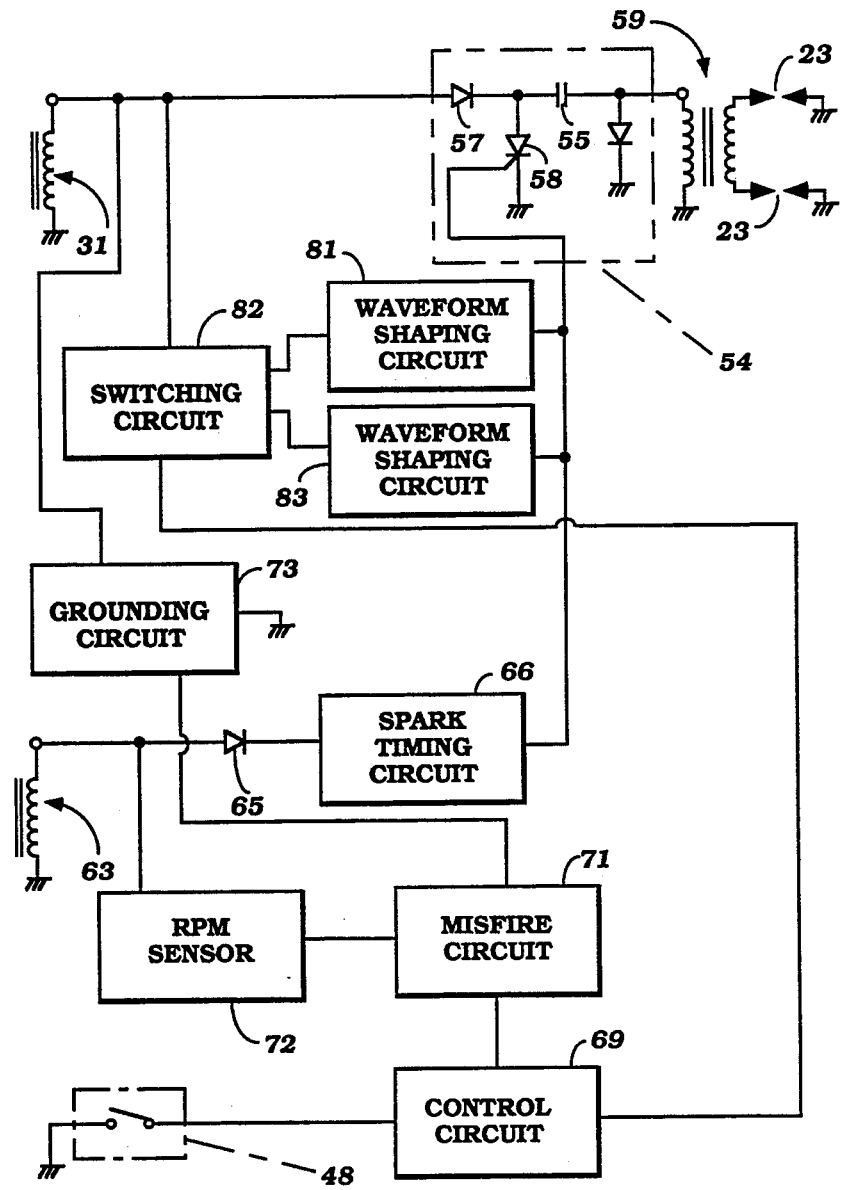
FIG. 6 is a schematic electrical diagram showing another embodiment of the invention.
Figure 7:
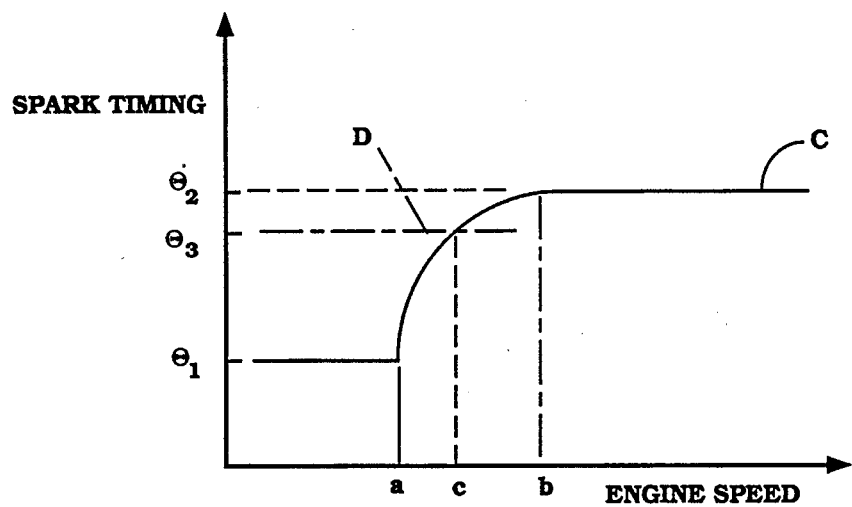
FIG. 7 is a spark advance curve for the embodiment shown in FIG. 6 with engine speed being shown on the abscissa and spark advance being shown on the ordinate.

FIGS. 6 and 7 show another embodiment of the invention which is generally similar to the embodiment of FIGS. 4 and 5. In this embodiment, however, the use of two separate pulser coils is made unnecessary by the circuitry chosen. Because of the similarity of this embodiment to the embodiment of FIGS. 4 and 5, components of this embodiment which are substantially the same as or which serve the same functions as the embodiment of FIGS. 4 and 5 have been identified by the same reference numerals and will be described again only insofar as it necessary to understand the construction and operation of this embodiment.

In this embodiment, the output of the spark timing circuit 66 is in constant communication with the gate of the thyristor 58 and cooperates with a normal spark firing circuit 81 which is controlled by a switching circuit 82 so as to provide a spark advance curve as shown in C in FIG. 7. The curve C is basically the same as the curve A in FIG. 5 in that it has a fixed normal spark advance $O_1$ at engine speeds up until a speed a advances along a curve to a fixed spark advance $O_2$ when the engine speed is above the predetermined engine speed b.

There is also provided a further wave formed shaping circuit 83 that is controlled by the switching circuit 82 and when switched on, causes the spark timing circuit 66 to give a fixed advance at the angle $O_3$ which is the same as if the engine were continuously operating at a speed c. This fixed spark advance curve is indicated at D.

Therefore, this device operates so that when the control circuit 69 senses normal engine operation by activation of the grounding circuit 73, the normal spark advance curve C will be followed. If, however, an abnormal condition is sensed, the control circuit 69 actuates the switching circuit 82 so that the wave formed shaping circuit 83 cooperates with the spark timing circuit 66 to give the fixed advance D and prevent backfiring or firing back during the misfiring operation, as previously described.

Figure 8:
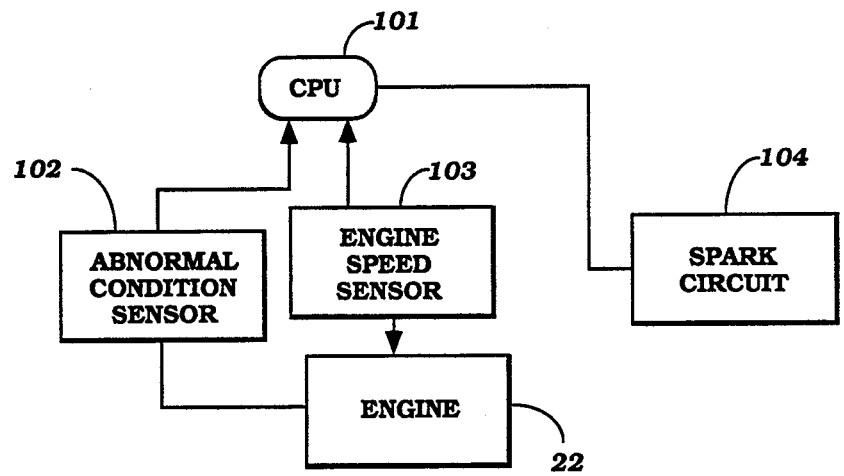
FIG. 8 is a schematic block diagram showing another embodiment of the invention.
Figure 9:
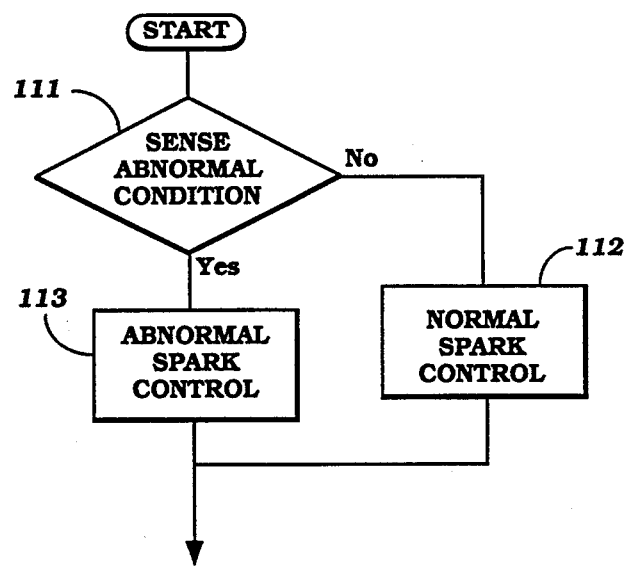
FIG. 9 is a block diagram showing the logic of operation of the embodiment of FIG. 8.

FIGS. 8 and 9 show another embodiment of the invention wherein the control for the spark timing and misfiring is accomplished by means of a micro or mini computer (CPU) identified generally by the reference numeral 101. The CPU 101 obtains an abnormal engine condition signal from the engine 22 by an abnormal condition sensor 102. This abnormal condition may comprise overheating, misfiring, or a presensed condition, such as shifting when it is desired to reduce the engine speed for protection or assistance. In addition, an engine speed sensor 103 outputs a signal of engine speed to the CPU. The CPU 101 controls the spark timing and also misfiring of a spark circuit, which may be of any known type, such as the aforedescribed type and which is indicated generally at 104.

The procedure for controlling the spark circuit 104 by the CPU 101 is shown in the block diagram of FIG. 9. The program starts and at the step 111 the CPU determines whether the sensor 102 has outputted a signal indicating an abnormal condition or one in which spark control and/or misfiring is required. If no abnormal condition is sensed, the program moves to the step 112 and the CPU permits the spark circuit 104 to commence normal firing at a normal timing interval in accordance with a timing curve of the type shown in FIGS. 5 at A or FIG. 7 at C.

If, however, there is an abnormal condition sensed at the step 11, the program moves to the step 113 for abnormal spark control. This can accomplish both misfiring of the engine for protective purposes and also control of the spark timing circuit 104 so as to provide sufficient spark advance so as to insure that the engine does not backfire or fire back by employing, for example, a spark curve of the type shown at B in FIG. 5 or D in FIG. 7.

Figure 10:
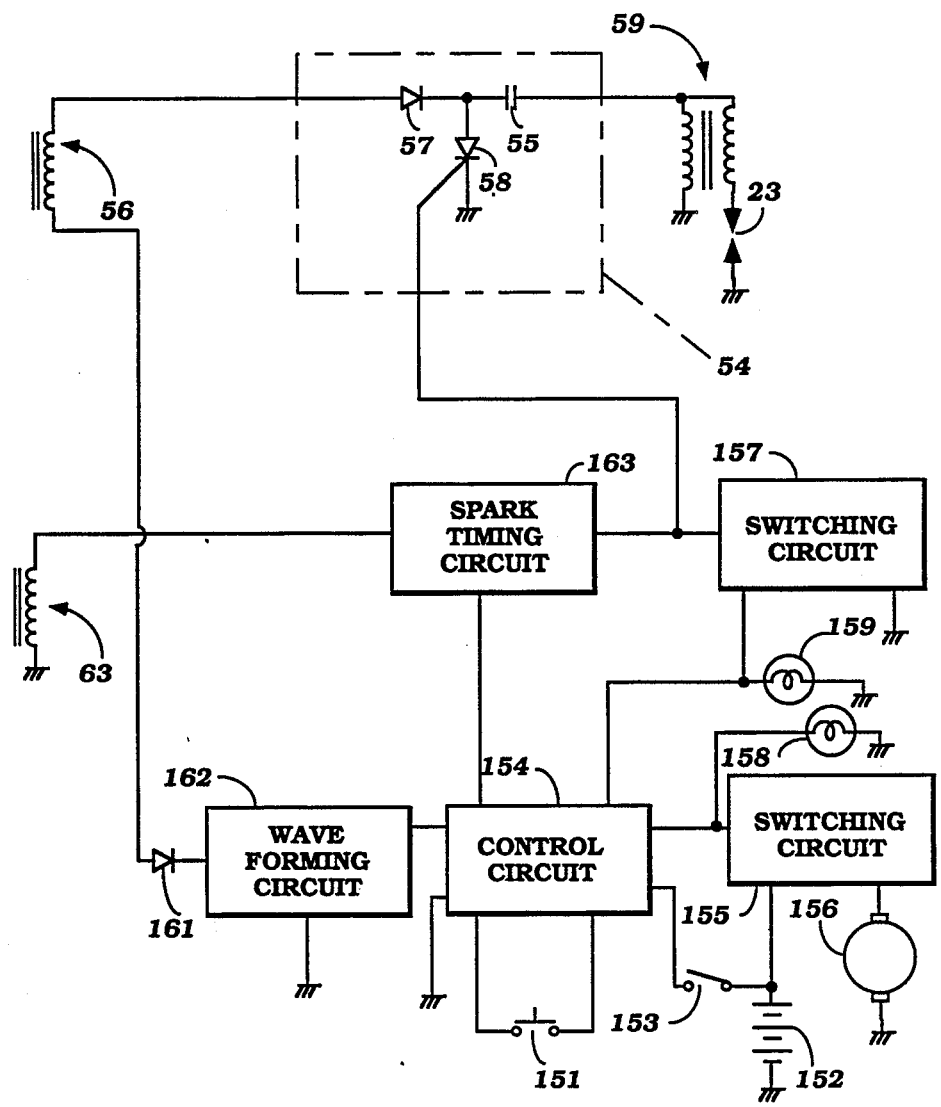
FIG. 10 is a schematic electrical diagram showing a further embodiment of the invention.

FIG. 10 shows another embodiment of the invention that incorporates a single switch 151 that is provided for alternately starting and stopping of the engine. This embodiment is generally similar to the embodiment of FIG. 5 of the copending application entitled "Engine Control Means For Marine Propulsion", Ser. No. 229,925, filed Aug. 8, 1988 in the name of Hodaka Nagakura, corresponding to Japanese Application Sho-62-198726, dated Aug. 8, 1987, and assigned to the assignee of this application, now U.S. Pat. No. 4,917,061. Reference may be had to that copending application for the general operation of the device and how the single switch 151 controls the stopping and starting of the engine.

Briefly summarized, the system includes a powering battery 152 that supplies power through a main switch 153 to a control circuit 154. The control circuit 154 controls a first switching circuit 155 when it is determined that the switch 151 has been closed and the engine is not running so as to operate a starter motor 156 to effect starting. If the engine is running, and the switch 151 is closed, the control circuit 154 energizes a second switching circuit 157 to stop the running of the engine by grounding the thyristor 58 of the ignition circuit 54 which is the same as the previously described embodiments and thus the components of it which are the same have been identified by the same reference numerals. Grounding of the thyristor 58 prevents discharge of the capacitor 55 and hence no voltage will be induced in the coil 59 to fire the spark plug 53.

There are provided respective display lamps 158 and 159 for indicating when the starter motor 156 or switching circuit 157 have been energized to either start or stop the engine. The control circuit also receives a speed signal indicative of engine speed from the charging coil 56 through a rectifying diode 161 and wave forming circuit 162.

The control circuit 154 also controls a spark timing circuit 163, in the manner of any of the previously described embodiments, so as to provide an arrangement for preventing backfiring or firing back by advancing or appropriately controlling the spark during abnormal running conditions or when desired. In addition, the circuit 163 may provide advance spark during cold start up for faster arm up.

As another alternative to the construction and circuitry shown in FIG. 10, the main switch 153 may be wired into the circuit between the battery 152 and the junction between the switching circuit 155 and the control circuit 154.

Figure 11:
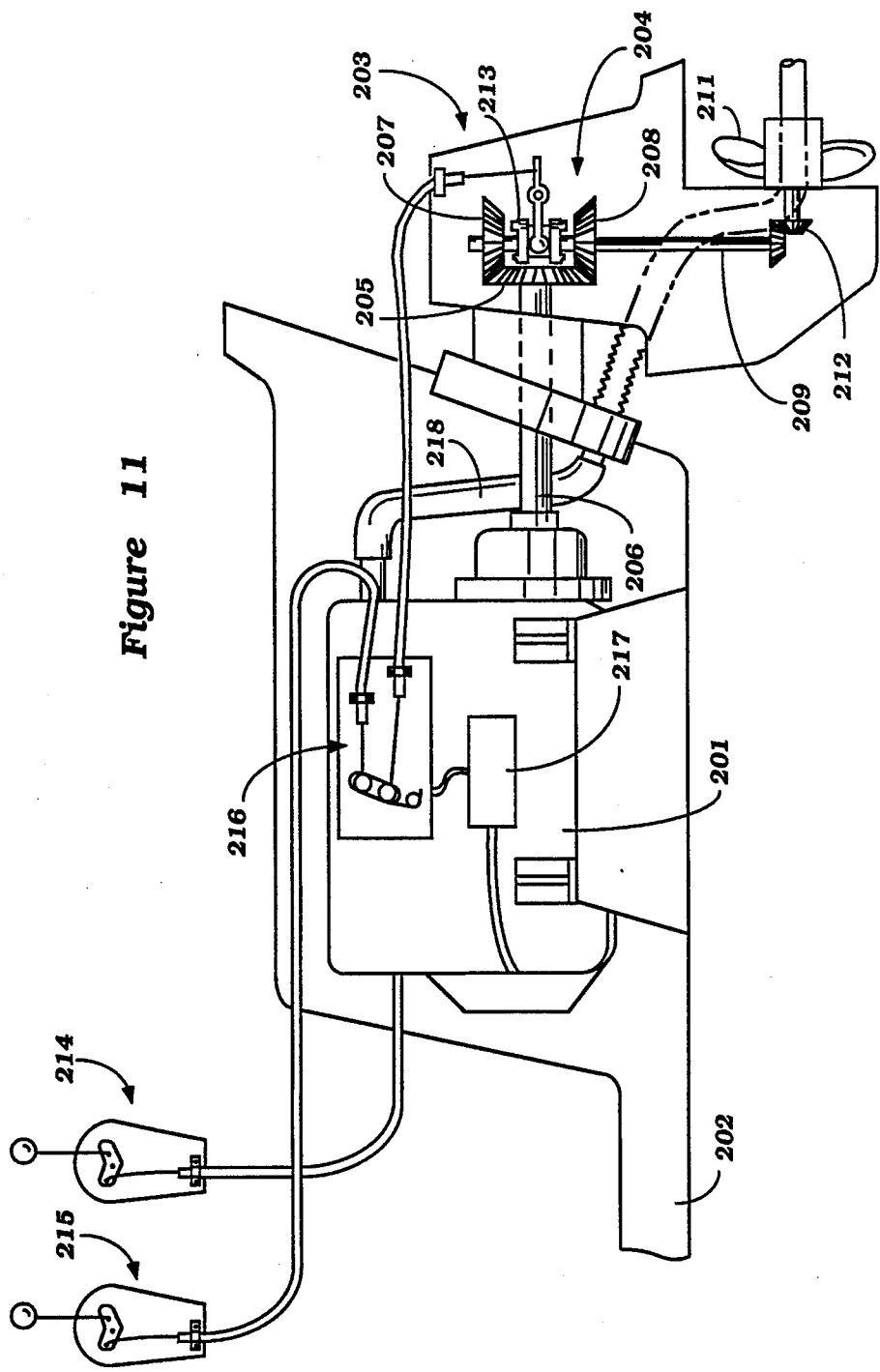
FIG. 11 is a partial side-elevational view showing an embodiment of the invention as applied to a shift assisting mechanism.

In connection with all of the embodiments of the invention as thus far described, it has been indicated that the misfiring of the engine may be accomplished in response to either a sensed abnormal condition of the engine or in response to a sensed external condition such as the shifting of the associated transmission so as to facilitate engagement of the gears or dog clutches of that transmission. FIG. 11 shows such an embodiment wherein there is provided an internal combustion engine 201 of the spark ignited type which powers a watercraft 202. In the illustrated embodiment, the watercraft 202 has an inboard/outboard drive using an outboard drive unit, indicated generally by the reference numeral 203 and which has a forward, neutral, reverse transmission 204 driven by a bevel gear 205 that is drivingly coupled to the engine output shaft 206. There are a pair of counter rotating bevel gears 207 and 208 enmeshed with the driving gear 205 and journaled on a driveshaft 209 which drives a propeller 211 through a bevel gear train 212.

A dog clutching arrangement 213, which is common in this type of arrangement, selectively couples either the gear 207 or the gear 208 to the driveshaft 209 for achieving either forward or reverse drive. In addition, a neutral position is provided, which, as shown, uncouples both of the gears 207 and 208 from the driveshaft 209 so that the propeller 211 will not be driven.

The engine is provided with a remotely located throttle control mechanism 214 and transmission control mechanism 215. The transmission control mechanism 215 is coupled to the dog clutching element 213 by means including a sensing system 216 which will provide a sensing signal when a shift is being made. This signal is transmitted to a sensing device 217 that provides an output control corresponding to the control or signal transmitted by the overheat sensor 48 in the circuitry previously described so as to accomplish engine speed reduction and at the same time to provide insurance against backfiring in an exhaust system including a flexible conduit 218 that delivers exhaust gases from the engine 201 to an underwater exhaust gas discharge in the lower unit of the outboard drive 203. Firing back through the induction system is also avoided.

Figure 12:
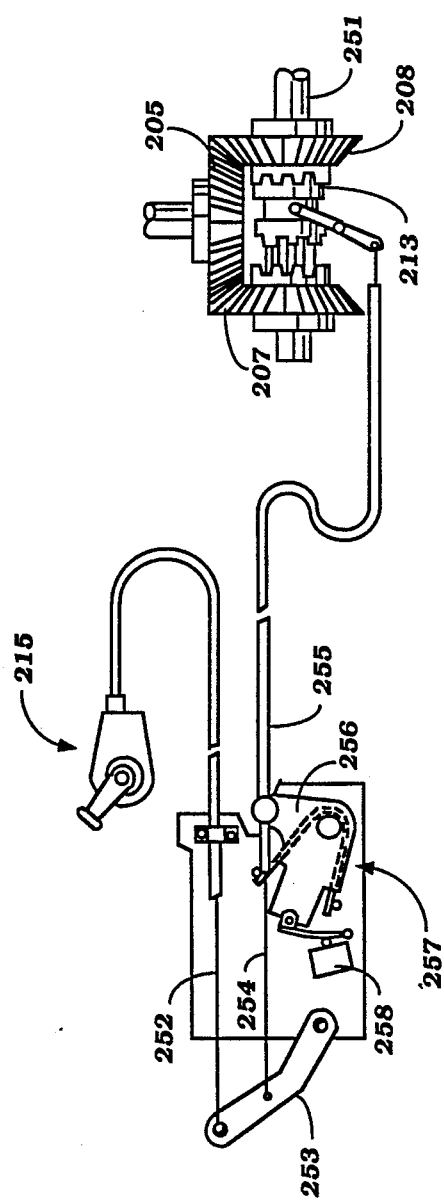
FIG. 12 is a partially schematic partial view showing a still further embodiment of the invention.

FIG. 12 shows another embodiment of the invention as applied to a shift assist mechanism. This embodiment differs from the embodiment of FIG. 11 only in the shift sensing device and for that reason components of the embodiment of FIG. 11 have been identified by the same reference numerals and will not be described again, except insofar as is necessary to understand the construction and operation of this embodiment. It should be noted that this embodiment is more typical of the type found in an outboard motor wherein the driving gear 205 rotates about a vertically extending rather a horizontally extending axis and wherein the driven bevel gears 207 and 208 are associated with a propeller shaft 251.

The shift control mechanism 215 operates a first bowden wire 252 that is connected to one end of a shift control lever 253. A second bowden wire 254 connected the shift control lever 253 with the dog clutching element 213. A protective sheath 255 of the bowden wire 254 is connected to a pivotally supported lever 256 and when a shift is being made, the lever 256 will pivot by means of the reaction forces and operate a sensing device, indicated generally by the reference numeral 257 that includes a switch 258 that outputs a signal indicating that a shift is being made. This signal is then used to interrupt the ignition to slow the engine in accordance with the constructions of any of the previously described embodiments. As with any of those embodiments, when shifting is being accomplished, the backfiring and firing back will be precluded by changing the spark control curve.

It should be noted that a number of embodiments of the invention have been illustrated and described and in each of which there is an arrangement provided for slowing the engine under abnormal running conditions or sensed external conditions and backfiring is precluded by altering the spark advance curve when the engine is being slowed. Although a number of the embodiments of the invention have been illustrated and described, various further changes and modifications may be made without departing from the spirit and scope of the invention, as defined by the appended claims.

We claim:

1. In a spark control for an internal combustion engine comprising spark timing means for firing a spark plug in accordance with a first spark advance curve in relation to an engine characteristic at a given speed range and a second, different advance curve in relation to said engine characteristic and within the given speed range, one of said advance curves providing a fixed spark advance and means for selecting which of said advance curves control spark timing within the given speed range.

2. In a spark control for an internal combustion engine as set forth in claim 1 wherein the other of the spark advance curves provides varying advance with the engine characteristic.

3. In a spark control for an internal combustion engine comprising spark timing means for firing a spark plug in accordance with a first spark advance curve in relation to engine speed and a second, different advance curve in relation to said engine speed, and means for selecting which of said advance curves control spark timing response to shifting of an associated transmission.

4. In a spark control for an internal combustion engine as set forth in claim 3 wherein the engine is also misfired when the shifting is sensed.

5. In a spark control for an internal combustion engine as set forth in claim 3 wherein one of the spark advance curves provides a fixed spark advance.

6. In a spark control for an internal combustion engine as set forth in claim 3 wherein one of the spark advance curves provides varying advance with the engine speed.

7. In a spark control for an internal combustion engine as set forth in claim 6 wherein the other spark advance curves provides a fixed spark advance.

8. In a spark control for an internal combustion engine comprising spark timing means for firing a spark plug in accordance with a first spark advance curve in relation to an engine characteristic and a second, different advance curve in relation to said engine characteristic, and means for selecting which of said advance curves control spark timing for changing the spark advance curve employed in response to a sensed abnormal running condition.

9. In a spark control for an internal combustion engine as set forth in claim 8 wherein one of the spark advance curves provides a fixed spark advance.

10. In a spark control for an internal engine as set forth in claim 9 wherein the fixed spark advance curve is advanced from the engine idle spark advance.

11. In a spark control for an internal combustion engine as set forth in claim 8 wherein one of the spark advance curves provides varying advance with the engine characteristic.

12. In a spark control for an internal combustion engine as set forth in claim 11 wherein the other spark advance curves provides a fixed spark advance.

13. In a spark control for an internal combustion engine as set forth in claim 8 wherein the engine is misfired in response to the abnormal sensed running condition.

14. In a spark control for an internal combustion engine as set forth in claim 13 wherein the means for selecting the advance curves selects a normal advance curve during normal engine running and a different advance curve when the abnormal condition is sensed.

15. In a spark control for an internal combustion engine as set forth in claim 14 wherein the abnormal spark advance curve provides an advance spark from idle spark.

* * * * *